United States Patent
Shustack et al.

(10) Patent No.: US 7,166,555 B2
(45) Date of Patent: *Jan. 23, 2007

(54) COATED CERAMIC CATALYST SUPPORTS AND METHOD

(75) Inventors: Paul John Shustack, Elmira, NY (US); Kimberly Sue Wayman, Gillet, PA (US)

(73) Assignee: Corning Incorporated, Corning, NY (US)

( * ) Notice: Subject to any disclaimer, the term of this patent is extended or adjusted under 35 U.S.C. 154(b) by 31 days.

This patent is subject to a terminal disclaimer.

(21) Appl. No.: 11/057,911

(22) Filed: Feb. 14, 2005

(65) Prior Publication Data

US 2006/0183632 A1    Aug. 17, 2006

(51) Int. Cl.
*B01J 31/00* (2006.01)
(52) U.S. Cl. .................................... 502/159
(58) Field of Classification Search ............... 502/159
See application file for complete search history.

(56) References Cited

U.S. PATENT DOCUMENTS

| | | | | |
|---|---|---|---|---|
| 4,012,324 A | * | 3/1977 | Gregor | 210/500.37 |
| 4,483,940 A | * | 11/1984 | Ono et al. | 502/159 |
| 5,763,352 A | * | 6/1998 | Jung et al. | 502/315 |
| 6,200,483 B1 | * | 3/2001 | Cutler et al. | 210/685 |
| 6,440,309 B1 | * | 8/2002 | Cohen | 210/640 |
| 6,491,883 B1 | * | 12/2002 | Mori et al. | 422/306 |
| 6,649,559 B1 | * | 11/2003 | Drost et al. | 502/182 |
| 2005/0019507 A1 | * | 1/2005 | Renz et al. | 428/32.34 |
| 2005/0037147 A1 | * | 2/2005 | Ogunwumi et al. | 427/393.6 |
| 2005/0191480 A1 | * | 9/2005 | Tao et al. | 428/304.4 |

FOREIGN PATENT DOCUMENTS

JP        52-136897 A     *  11/1977

* cited by examiner

*Primary Examiner*—J. A. Lorengo
*Assistant Examiner*—Jennine Brown
(74) *Attorney, Agent, or Firm*—Kees van der Sterre

(57) ABSTRACT

Porous ceramic catalyst supports are pre-coated with a passivation layer prior to applying a catalyst or catalyst support coating, the passivation layer consisting of a coating of a liquid mixture comprising at least one coating material selected from the group of polyvinyl alcohol/vinyl amine copolymer, polyvinyl alcohol/vinyl formamide copolymer, and gelatin.

8 Claims, No Drawings

COATED CERAMIC CATALYST SUPPORTS AND METHOD

BACKGROUND OF THE INVENTION

The present invention relates to the application of catalyst or catalyst support coatings to porous ceramic catalyst supports of the kind used for the control of exhaust emissions from internal combustion engines. More particularly, the invention relates to pre-coating or passivation procedures that enable the application of catalyst coatings to such ceramic catalyst supports while avoiding the harmful effects of those coatings on the physical properties of the ceramic supports.

The adverse effects of catalyst coating processes on the thermal properties of ceramic catalyst supports such as ceramic honeycombs are well known, and numerous solutions to those problems have been suggested. The principal problem is that oxide constituents of the catalyst or catalyst support coatings, such as alumina, will penetrate into the microstructure of the ceramic supports during the coating and curing processes, filling that microstructure in a manner that typically increases the thermal expansion coefficient of the catalyzed honeycombs. These thermal expansion increases substantially reduce the thermal shock resistance of the honeycombs. U.S. Pat. Nos. 4,452,517, 4,483,940, 4,532,228 and 5,346,722 describe this problem and various solutions thereto.

Among the honeycomb structures presently used for internal combustion engine emissions control, specifically to provide for the efficient removal of particulates such as soot from the exhaust stream, is a type of structure referred to in the art as a wall-flow filter. Such filters are typically porous ceramic honeycombs with end-plugs provided in alternate channels, whereby exhaust gases traversing the structures must pass through the porous channel walls to capture the particulates prior to exhaust discharge. Examples of ceramic materials useful for making such filters, but which can be adversely affected by catalyst coating processes, are cordierite, aluminum titanate, silicon carbide, refractory alkali zirconium phosphates, and low-expansion alkali aluminosilicates such as beta-eucryptite, beta-spodumene, and pollucite. Examples of exhaust filter designs employing these materials are disclosed in U.S. Pat. Nos. 6,620,751, 6,673,414 and 6,468,325.

To address tightening diesel engine emissions regulations being adopted in the United States and Europe, recent attention has focused on basic improvements in the design and performance of ceramic wall-flow honeycomb filters for treating diesel engine exhaust gases. Among other improvements, design changes allowing for the use of catalyst coatings to control hydrocarbon and/or nitrogen oxide emissions are being implemented. The goal is to develop an improved high-temperature-resistant, high-thermal-shock-resistant, low cost honeycomb soot filter compatible with advanced emissions control catalyst technologies that can replace current high-cost and/or uncatalyzed particulate filters.

Materials and methods successfully used in the prior art to minimize the adverse effects of catalyst coating processes on the thermal expansion coefficients and thermal shock resistances of flow-through ceramic honeycomb catalyst supports have proven largely unsuitable for the production of catalyzed wall-flow filters. A persistent problem is the need to maintain high gas permeability as well as a low coefficient of thermal expansion in the catalyzed filters, while still providing a catalyst loading sufficient for effective catalytic treatment of the exhaust stream. The catalyst coatings must be disposed within the filter structure in such a way that they provide an effective distribution of catalyst without unacceptably degrading either the thermal expansion coefficients or the required high gas permeabilities of the supporting ceramic wall structure.

Desirably, increases in CTE resulting from the application of washcoats or catalyst coatings should not exceed $10 \times 10^{-7}/^\circ$ C. as measured at a temperature of 1000° C., and CTE values for the washcoated filters should not exceed $25 \times 10^7/^\circ$ C. as measured at that temperature, in order to preserve the thermal shock resistance of the filter. Further, gas permeabilities through the catalyzed filter should be sufficient to maintain pressure drops below 8 kPa at exhaust gas space velocities up to 150,000 $hr^{-1}$ after filter regeneration to remove trapped particulates.

SUMMARY OF THE INVENTION

The present invention provides a method for masking or "passivating" the fine pore structure of porous ceramic bodies to be used as supports for catalyst coatings or washcoatings that protects against CTE increases yet does not unacceptably decrease the porosity or gas permeability of the catalyst-coated or washcoated support. Thus the method is effective to prevent catalyst or washcoat intrusion into the fine pore structure of the support as well as unacceptable blocking of the open wall pore structure by the catalysts or washcoats, yet still supports good distribution of the catalysts or washcoats on or into the ceramic walls.

In a first aspect, then, the invention includes a method for base-coating a porous ceramic catalyst support, prior to applying a catalyst or catalyst support coating thereto, which comprises the step of applying to the support a coating of a liquid mixture comprising at least one coating material selected from the group of polyvinyl alcohol/vinyl amine copolymer, polyvinyl alcohol/vinyl formamide copolymer, and gelatin to provide a coated support. The resulting coating is then dried to leave a layer of the coating material on the support that is compatible with conventional catalyst coating and washcoating formulations, yet is sufficiently stable to block unwanted penetration of the catalyst or washcoating liquids into the fine pore structure of the ceramic support.

In another aspect, the invention includes a porous ceramic body such as a ceramic catalyst support supporting a coating of a material selected from the group of polyvinyl alcohol/vinyl amine copolymer, polyvinyl alcohol/vinyl formamide copolymer, and gelatin. Ceramic catalyst supports provided with such coatings can be treated to apply catalyst coatings or washcoatings thereto utilizing processes that are conventional for such applications without unacceptably increasing the thermal expansion coefficients of the catalyst supports or reducing the gas permeability thereof.

In practicing the method of the invention it is generally preferred to include a chemical cross-linking agent in the liquid coating mixture that can be activated, e.g. during drying, to promote cross-linking of the copolymer or gelatin. Catalyst supports provided with chemically cross-linked layers of coating material continue to exhibit good coating compatibility with conventional catalyst coating or washcoating formulations, yet the cross-linked coatings exhibit improved resistance to dissolution during the catalyst coating or washcoating process. Thus the cross-linked layer of coating material more effectively protects the ceramic support against thermal expansion increases and reductions in gas permeability.

Another useful modification of the coating method of the invention is to adjust the pH of the liquid coating mixture prior to application of the mixture to the ceramic support. Liquid mixtures of these copolymers or gelatins adjusted to pH values in the pH range of 3 to 8 offer a processing advantage in that the passivated parts will only minimally affect the pH of the typically acidic washcoating or catalyst coating preparations.

While any porous ceramic catalyst support provided with a base or passivation coating in accordance with the invention offers significant advantages for the application of catalyst coatings and catalyst support washcoats, the method particularly improves the coating characteristics of catalyst supports composed of ceramics selected from the group consisting of cordierite and aluminum titanate. Ceramics such as silicon carbide may also be treated, but the advantages of cordierite and aluminum titanate ceramics for the manufacture of flow-through catalyst supports and wall flow filters is a consequence of their very low thermal expansion coefficients, and those low coefficients are at least partly the result of substantial microcracking of the ceramic matrix. The method of the invention is particularly effective for protecting such microcracked ceramics against the thermal expansion increases that can result from ceramic coating or washcoating processes, and in addition, helps to preserve high gas permeability where the catalyst supports are employed in selectively plugged configurations as wall-flow filters.

DETAILED DESCRIPTION OF THE INVENTION

Polyvinyl alcohol/vinyl amine (PVOH/VAM), polyvinyl alcohol/vinyl formamide (PVOH/VF) copolymers or gelatins are particularly well suited for providing barrier coatings on porous ceramic catalyst support materials because they are highly compatible with conventional washcoating and catalyst coating materials and processes. These barrier coating materials form aqueous solutions or suspensions of relatively low viscosity that will fully penetrate the pore structures of porous, microcracked ceramic substrates. In addition, the dried coatings are hydrophilic and thus easily wetted by such washcoating and catalyst coating preparations, so that they do not interfere with the distribution of such preparations on the catalyst supports. Adequate amounts of the washcoat (catalyst) materials can be easily deposited over the dried barrier coatings using conventional procedures.

Any of a wide variety of copolymer and gelatin solutions of the kind above described can be employed. Among the gelatins that may be used are those derived from sources such as cattle hides, cattle bones, pork skin, and fish skin. The gelatin can be Type A or Type B and be of any Bloom value. Gelatin of low ion content, e.g. photographic gelatin grades, are preferred. Gelatins of low or zero Bloom value are also preferred because they obviates the need for heating during dissolution or processing. A particularly preferred gelatin is High Molecular Weight Fish Gelatin from Norland Products Inc. of Cransbury, N.J., USA.

PVOH/VAM and PVOH/VF copolymers capable of forming flowable aqueous barrier coating solutions are commercially available over a relatively wide range of molecular weights. Commercially available copolymers over a range of molecular weight from about 30,000–140,000 are particularly suitable. The amounts of vinyl amine or vinyl formamide present in the copolymers may also be varied to meet the requirements of specific applications. Specific examples of commercially available copolymers include Erkol™ M6, M12, M6i, and M12i copolymers, commercially available from Erkol, S. A., Tarragona, ES.

Although not required, chemical crosslinkers may be added to these liquid barrier coating formulations where the conditions to be encountered in washcoating or catalyst coating could cause harmful barrier coating interactions. When added to the aqueous polymer solutions, these crosslinkers cause the polymers to crosslink during the drying process, significantly decreasing the water solubility of the dried coatings. Reduced water solubility reduces the possibility of barrier coating migration during washcoating, e.g., copolymer extraction from the barrier coating into the washcoat or catalyst coating that could result in reduced catalyst efficacy. At the same time, any possible dissolution of the copolymer from microporous or microcracked regions of the ceramic that might permit particle intrusion during washcoating or catalyzation can be minimized.

Suitable crosslinking agents are those that contain functional groups that are reactive with one or more of the functional groups on the base passivation gelatin or copolymer. Particularly useful are agents that will not facilitate crosslinking until the passivation coating liquid has been deposited onto the porous ceramic substrate. Formulations of crosslinkers and base barrier coating materials that can be blended and stored as a one-part composition with little or no crosslinking on shipping and storage offer advantages, but two-part compositions where the copolymer and crosslinker are kept separate and then blended when needed are also suitable.

Particularly suitable cross-linkers are materials that contain two or more functional groups that are capable of reacting with the functional groups on the base gelatin or copolymer barrier materials under the conditions of use. In the case of gelatin-based barrier coating formulations, the cross-linker should include groups capable of interacting with carboxyl, amino, alcohol, and phenolic functional groups along the protein polymer chain, while in the case of PVOH/VAM copolymer formulations the agents should effectively interact with pendant hydroxyl and amino functional groups.

Examples of organic copolymer cross-linkers include, but are not limited to, multifunctional carbodiimides, aldehydes, anhydrides, epoxies, imidates, isocyanates, melamine formaldehyde, epichlorohydrin, 2,5-dimethoxytetrahydrofuran, and 2-(4-dimethylcarbomoyl-pyridino)ethane-1-sulfonate. Among the particularly preferred commercially available cross-linkers are multifunctional carbodiimide materials such as the Carbodilite™ V-02, V-02-L2, V-04, E-02, and E-03A carbodiimides from Nisshinbo Industries Inc. Chiba, Japan. Inorganic crosslinkers for these copolymers include phosphorous oxychloride, titanium tetrabutoxide, ammonium zirconium carbonate, and the like.

The most effective cross-linkers for gelatin-based barrier coating solutions are the glyoxal-based cross-linking additives. Examples of suitable commercially available materials include Berset™ 2506, 2125, 2155, and 2700 cross-linkers from Bercen, Inc. Cranston, R.I., USA.

It is a particular advantage of the above-described gelatin and copolymer-based barrier coating formulations that they will easily burn off completely during conventional washcoat or catalyst coating calcination steps at temperatures not exceeding about 550° C. Further, the decomposition byproducts, e.g., gaseous amines, ammonia, and oxides of carbon and hydrogen from the copolymers and typical carbonaceous materials from the gelatins, are harmless to catalysts and washcoats. Most importantly, both the copolymer and/or gelatin coating materials and the byproducts of their removal are substantially chlorine-free, avoiding the possibility of substrate or catalyst corrosion that can arise with some of the prior art barrier coating materials.

As previously suggested, PVOH/VAM, PVOH/VF and gelatin polymers are readily soluble in water. In order minimize the effects of the copolymer or gelatin coatings on the pH of subsequently applied washcoating or catalyst preparations, however, it is in most cases desirable to adjust the pH of the solutions to values in the range of 3–8, and this is easily accomplished by means of acid additions to the mixtures. Due to their relatively low viscosities, application of these polymer and gelatin solutions to porous ceramic substrates is conveniently accomplished by soaking or vacuum infiltration.

Illustrative examples of suitable materials and processes for the coating of porous ceramic catalyst substrates in accordance with the invention are set forth below. A generalized procedure for applying and evaluating the performance of the coatings is as follows:

Sample Preparation Procedure

Solutions of PVOH/VAM are made by first weighing out a selected charge of deionized water into a glass container. The container is covered with a lid having an opening for the shaft of a stainless steel mixer blade and for the addition of dry constituents to the mixture, but adapted to minimize evaporation during mixing.

A measured quantity of a selected PVOH/VAM or PVOH/VF powder is added to the vortex of the water in the jar while stirring at 600 rpm. The jar then is immersed into a heated oil bath at 85° C. and then the mixing speed is increased to 1000 rpm. Mixing is continued for two hours after which the mixed contents is immediately filtered while hot through a paper towel to remove insoluble material, and cooled to room temperature.

The pH of the resulting mixture is then adjusted to approximately 7 through the addition of concentrated nitric acid, and a measured quantity of a selected chemical cross-linker is added to the mixture in cases where a cross-linked barrier coating is required. The crosslinker is added to the vortex of the mixture while stirring at a mixer rate of 600 rpm, mixing continuing for two minutes until a homogeneous blend is produced.

The same preparation procedure is followed for the preparation of gelatin barrier coating solutions, except that heating of the mixture to dissolve the gelatins, and filtration of the gelatin mixture, are not required. Optionally, a preservative to stabilize the gelatin solution, such as an addition of 0.2% of Germaben II™ preservative from the ISP Corporation, Wayne, N.J., USA can be added prior to storage.

Ceramic honeycomb catalyst substrate samples for evaluating the effectiveness of the prepared barrier coating solutions are blown out with high pressure air to remove dust, and then weighed. The samples selected are of aluminum titanate composition with principal crystal phases of aluminum titanate and alkaline earth feldspar. The honeycombs have a channel density of about 46 cells/cm2, a channel wall thickness of about 0.3 mm, and a wall porosity of about 50% by volume with high gas permeability. The honeycombs have an average linear coefficient of thermal expansion (CTE) of approximately $8 \times 10^{-7}/°$ C. as measured at a temperature of about 1000° C.

A uniform barrier coating is deposited on the channel walls of these substrates by immersing each sample in one of the prepared copolymer or gelatin solutions, applying vacuum to the sample and solution for one minute, and then releasing the vacuum. This cycle of vacuum application and release is repeated two additional times, after which excess coating solution is poured off, the coated substrates are blown out with high pressure air, and then weighed. Following weighing the coated samples are dried at 100° C. over night in a hot air oven, and finally re-weighed to determine dry coating pickup.

The barrier-coated samples are evaluated for effectiveness in preserving a low thermal expansion coefficient and high gas permeability by subjecting them to a conventional alumina washcoating process. The barrier-coated samples are immersed in a colloidal alumina washcoating solution, commercially available as Nyacol™ AL-20 solution from Nyacol Corporation, Ashland, Mass., USA, and a vacuum is applied to the sample and solution for one minute. The vacuum is then released and excess washcoating solution is removed by blowing out with high pressure air.

The washcoated samples are next weighed, dried in a hot air oven at 100° C. overnight, and reweighed to determine dried washcoated weight. They are then subjected to a washcoat calcination procedure during which they are heated at a rate of 1.6° C./min to 550° C., held at 550° C. for 3 hours and then cooled to room temperature at a rate of 1.6° C./min. The samples are reweighed one day later to determine calcined washcoat pickup after removal of the barrier coating material, and they are then submitted for thermal expansion coefficient measurements and a determination of the flowing gas pressure drop resulting from the washcoating treatment.

Some results of an initial round of testing of PVOH/VAM and PVOH/VF copolymer barrier coatings are reported in Table 1 below. Included in Table 1 for each of the samples tested are an initial (dry) ceramic substrate weight, an identification of the passivation coating solution used to treat the sample with copolymer concentrations reported in percent by weight of the copolymer in water, the weight of the passivation coating on the sample after drying in percent by weight of the copolymer coated sample, the washcoating loading after drying and calcination of the washcoat in grams per liter of honeycomb bulk volume, and the measured thermal expansion coefficient of the washcoated ceramic support.

The passivation copolymers used in preparing the coating solutions are identified by letter in Table 1 as follows:

A—Erkol™ M6 copolymer (6% vinyl amine in polyvinyl alcohol)

B—Erkol™ M12 polymer; (12% vinyl amine in polyvinyl alcohol)

C—Erkol M6i polymer; (6% vinyl formamide in polyvinyl alcohol)

D—Erkol M12i polymer. (12% vinyl formamide in polyvinyl alcohol)

These M-series copolymers have average molecular weights in the range of 80–140,000 amw. None of these particular passivation solutions include a chemical cross-linking agent.

TABLE 1

Copolymer Passivation Coatings

| Sample Number | Initial Ceramic Sample Weight (g) | Passivation Agent Coating Solution | % (weight) Passivation Pickup | Washcoat Pickup (g/L) | Washcoated CTE (×10$^7$/° C.) |
|---|---|---|---|---|---|
| 1 | 35.584 | None | None | 32.74 | 46.9 |
| 2 | 33.982 | 10% A | 1.85 | 21.26 | 12.3 |
| 3 | 32.715 | 10% B | 1.91 | 18.08 | 21.5 |
| 4 | 35.842 | 10% C | 1.94 | 25.43 | 19.2 |
| 5 | 33.722 | 10% D | 1.98 | 21.78 | 17.4 |

Evident from the data in Table 1 are both the large increase in CTE resulting from the washcoating of these porous ceramic catalyst supports without the use of a passivation coating (Example 1), and the substantial protection against such increases afforded by the PVOH/VAM and PVOH/VF copolymer passivation coatings (Examples 2–5)

The effectiveness of some relatively dilute gelatin solutions in protecting against CTE increases from washcoating is reflected in data reported in Table 1A below. The gelatin employed as a passivation coating for the samples in Table 1A is Gelita Photo Bone Gelatin, Type 8669 from Gelita USA, Sioux City, Iowa, USA. Several different drying treatments are used to set the passivation coatings prior to washcoating, as reported in the Table, but the dried gelatin coatings are in each case hydrophilic and easily wettable. Thus the subsequently applied water-based alumina washcoating solutions can easily penetrate and wet the gelatin-coated ceramic substrate. Advantageously the dried gelatin coatings have relatively low room temperature water solubility and thus a minimal tendency to be extracted into the washcoat (catalyst) solutions.

An important advantage of gelatin solutions is that they provide blocking action superior to many of the prior art microcrack barrier coatings even at relatively low coating concentrations. Solutions comprising 1–3% gelatin by weight can deposit 0.2–0.7% of gelatin onto ceramic substrates of 50% open porosity, an amount that provides good protection from CTE increases in many cases, and that is also easily removed during washcoat or catalyst calcination procedures.

Table 2 below includes representative performance data for some additional passivation-coated samples prepared generally as above described, but wherein all of the passivation solutions include a chemical cross-linking agent. Data are included for both washcoasted ceramic honeycomb CTE and for washcoated ceramic pressure drop increases, the latter being reported as ratios of washcoated ceramic support pressure drop to bare ceramic support pressure drop. In some cases, the passivating solutions were pH-adjusted to pH values of about 7, as also indicated in the Table.

The copolymer solutions in Table 2 employed a PVOH/VAM copolymer of somewhat lower average molecular weight (amw.) than the copolymers employed in Table 1. The copolymer and gelatin used, as well as the cross-linking agents employed in each case, are as follows:

E—Erkol™ L12 copolymer (12% vinyl amine in PVOH; 30000–50000 amw.)
F—Norland High Molecular Weight Fish Gelatin—Norland Products Inc.
1—Carbodilite V-02 carbodiimide crosslinker
2—Berset 2700 glyoxal crosslinker—Bercen Inc.

Included in Table 2 for each of the samples tested are a sample number, an identification of the passivating material and cross-linking agent used in each passivation solution in percent by weight, the weight of passivation coating material applied (after drying) in grams, the washcoat pickup of the washcoated and calcined ceramic supports, in grams per liter of honeycomb bulk volume, the measured initial (uncoated) and final (washcoated) pressure drops through the ceramic samples, as measured with a synthetic carbon soot loading of 5 g/liter on the walls of the honeycombs, and the ratio of the uncoated to the washcoated pressure drops.

TABLE 1A

Gelatin Passivation Coatings

| Sample Number | Initial Ceramic Sample Weight (g) | Passivation Agent Coating Solution | % (weight) Passivation Pickup | Washcoat Pickup (g/L) | Washcoated CTE (×10$^7$/° C.) |
|---|---|---|---|---|---|
| 6 | 3.9669 | washcoat only | NA | 72.42 | 46.2 |
| 7 | 3.5681 | 0.5% gelatin/RT dry (48 hours) | 0.1794 | 60.15 | 24.3 |
| 8 | 3.8023 | 0.5% gelatin/100° C. dry @ 15 min | 0.1446 | 68.16 | 29.1 |
| 9 | 3.4389 | 1% gelatin/100° C. dry @ 15 min | 0.4100 | 66.81 | 24.7 |
| 10 | 3.5381 | 1% gelatin/RT dry | 0.4974 | 29.23 | 15.1 |
| 11 | 3.5448 | 1% gelatin/RT dry@48 hours | 0.3442 | 33.88 | 12.5 |

TABLE 2

Cross-linked Copolymer and Gelatin Passivation Coatings

| Sample Number | Passivation Solution | Init. Sample Weight (g) | Passivation Pickup (g) | Washcoat Pickup (g/L) | Initial Pressure Drop (@ 5 g/L) | Final Pressure Drop (@ 5 g/L) | Pressure Drop Ratio | Washcoated CTE ($\times 10^7/°$ C.) |
|---|---|---|---|---|---|---|---|---|
| 2-1 | E @7%; 1 @2% pH = 7 | 298.345 | 5.429 | 40.6 | 5.21 | 7.45 | 1.43X | 16.0 |
| 2-2 | E @ 7%; 1 @ 2% | 287.972 | 5.207 | 39.12 | 5.56 | 7.97 | 1.43X | 20.4 |
| 2-3 | F @ 7%; 2 @ 2% | 290.408 | 4.782 | 42.94 | 5.13 | 8.15 | 1.59X | 21.7 |
| 2-4 | F @ 7%; 2 @ 2% pH = 7 | 298.615 | 4.657 | 41.17 | 5.11 | 8.68 | 1.70X | 21.0 |
| 2-5 | F @ 7%; 2 @ 2% | 216.529 | 5.04 | 40.96 | 4.65 | 7.68 | 1.65X | 22.6 |
| 2-6 | F @ 7%; 2 @ 2% pH = 7 | 209.942 | 5.335 | 38.4 | 4.44 | 6.05 | 1.36X | 18.8 |
| 3-1 | E @ 7% 1 @ 3% pH = 7 | 209.362 | 5.244 | 39.9 | 3.7 | 5.58 | 1.51X | 18.3 |
| 3-2 | E @ 7% 1 @ 4% pH = 7 | 210.741 | 5.55 | 40.43 | 3.86 | 5.43 | 1.41X | 16.8 |
| 3-3 | F @ 7% 2 @ 4% | 209.003 | 4.183 | 40.8 | 3.93 | 5.4 | 1.37X | 23.7 |
| 4-1 | E@ 4.5%; 1@ 2:1 copolymer:crosslinker ratio | 209.15 | 3.798 | 41.35 | 3.6 | 4.85 | 1.35X* | 17.7 |
| 4-2 | E@ 5.0%; 1 at 3:1 copolymer:crosslinker ratio | 210.384 | 3.946 | 40.99 | 3.63 | 4.82 | 1.33X* | 18.6 |
| 4-3 | E@ 5.3% 1 at 4:1 copolymer:crosslinker ratio | 206.863 | 4.084 | 40.31 | 3.64 | 4.96 | 1.36X* | 18.7 |

*carbon soot loadings at 4 g/liter of honeycomb bulk volume

As the data in Table 2 reflects, the cross-linked copolymer and gelatin passivation coatings again prevented large increases in CTE in the washcoated samples, and kept increases in washcoated sample pressure drops at equal to or less than 2 times the pressure drops of the bare filters. At the same time, washcoat loadings of ≧40 g/L or more were achieved. Samples 3-1–3-3 in Table 2 indicate that increases in copolymer or gelatin concentration in the passivation solutions can result in further increases in CTE and pressure drop protection, but such increases should generally be accompanied by increases in cross-linker concentration. Otherwise some losses in washcoat adhesion can be encountered. Samples 4-1–4-3 indicate that significant increases in cross-linker concentration can be employed, providing good protection from both CTE and pressure drop increases, yet with good washcoat loadings still attainable.

Table 3 below sets forth additional examples of passivation mixtures illustrating further variations in proportions of copolymers, gelatins and crosslinkers. Included are mixed systems comprising combinations of copolymers and gelatin.

TABLE 3

Cross-linked Copolymer and Gelatin Passivation Coatings

| Sample Number | Passivation Solution | Init. Sample Weight (g) | Passivation Pickup (g) | Washcoat Pickup (g/L) | Initial Pressure Drop (@ 5 g/L) | Final Pressure Drop (@ 5 g/L) | Pressure Drop Ratio | Washcoated CTE ($\times 10^7/°$ C.) |
|---|---|---|---|---|---|---|---|---|
| 5-1 | F @ 6%; E @ 6% 2 @ 2:1 Resin:Crosslinker ratio | 209.92 | 4.72 | 35.71 | 4.17 | 7.77 | 1.86X | 15.2 |

TABLE 3-continued

Cross-linked Copolymer and Gelatin Passivation Coatings

| Sample Number | Passivation Solution | Init. Sample Weight (g) | Passivation Pickup (g) | Washcoat Pickup (g/L) | Initial Pressure Drop (@ 5 g/L) | Final Pressure Drop (@ 5 g/L) | Pressure Drop Ratio | Washcoated CTE ($\times 10^7/°C.$) |
|---|---|---|---|---|---|---|---|---|
| 5-2 | E @ 4.5%; 1 @ 2:1 copolymer:crosslinker ratio* | 208.834 | 3.77 | 41.49 | 3.82 | 5.08 | 1.33X | 24.3 |
| 5-3 | E @ 6%; 1 @ 2:1 copolymer:crosslinker ratio | 211.817 | 5.051 | 41.04 | 3.76 | 4.95 | 1.32X | 17.1 |
| 5-4 | E @ 7%; 1 @ 2:1 copolymer:crosslinker ratio | 215.32 | 6.043 | 40.05 | 4.01 | 5.48 | 1.36X | 16.3 |

*includes a minor addition of surfactant

Table 4 below sets forth additional examples of passivation mixtures useful in accordance with the invention. Included in the Table for each of the examples is a description of the composition of the solution employed, the uncoated weight of the ceramic honeycombs subjected to the passivation coating and washcoating processes, the weights of passivation coating and washcoating applied, and data respecting the washcoated CTE measurements and pressure drop measurements where determined on individual samples. The following additional chemical cross-linker was used in individual cases:

3—Berset 2125 glyoxal crosslinker—Bercen Inc.

TABLE 4

Additional Cross-linked Copolymer and Gelatin Passivation Coatings

| Sample Number | Passivation Solution | Init. Sample Weight (g) | Passivation Pickup (g) | Washcoat Pickup (g/L) | Washcoated Pressure Drop Increase | Washcoated CTE ($\times 10^7/°C.$) |
|---|---|---|---|---|---|---|
| 6-1 | E @ 7%; 3@2:1 copolymer:crosslinker weight ratio; pH = 3.75 | 207.285 | 6.047 | 36.23 | 54.26% | 19.4 |
| 6-2 | E @ 7%; 3@ 4:1 copolymer:crosslinker weight ratio; pH = 3.75 | 206.818 | 5.034 | 36.83 | 51.06% | 23.5 |
| 6-3 | E @ 7%; 3@ 8:1 copolymer:crosslinker weight ratio; pH = 3.75 | 207.115 | 4.717 | 39.47 | 41.49% | 24.2 |
| 6-4 | F @ 9%; 3@5% | 204.904 | 5.32 | 42.42 | 61.97% | 19.1 |
| 7-1 | F @ 10%; 1@15% | 209.115 | 6.698 | | | |
| 7-2 | F @ 10%; 2@15% | 213.65 | 6.403 | 40.51 | 1.46X | 20.2 |
| 7-3 | E @ 8%; 1@ 2:1 copolymer:crosslinker weight ratio | 214.14 | 6.811 | 34.72 | 1.17X | 12.9 |
| 7-4 | E @ 9%; 1@ 2:1 copolymer:crosslinker weight ratio | 213.297 | 8.062 | 37.55 | 1.15X | 13.9 |
| 7-5 | E @ 10%; 1@ 2:1 copolymer:crosslinker weight ratio | 214.114 | 9.232 | 35.34 | 1.46X | 14 |
| 8-1 | F @ 12%; 1 @15% | 208.012 | 7.781 | 36.28 | 1.3 | 16.7 |
| 8-2 | F @ 14%; 1@ 15% | 208.472 | 9.444 | 34.86 | 1.49 | 13.4 |
| 8-3 | A @ 8%; 1 @4:1 copolymer:crosslinker weight ratio | 208.239 | 6.501 | 38.16 | 1.27 | 14.2 |
| 8-4 | A @ 8%; 1 @ 20:1 copolymer:crosslinker weight ratio | 209.54 | 5.822 | 39.13 | 1.36 | 19.1 |
| 8-5 | E @ 12%; 1 @ 3.75:1 copolymer:crosslinker weight ratio | 209.057 | 9.872 | 36.93 | 1.34 | 12.5 |

Samples 6-1 to 6-3 above illustrate the effects of different cross-linker compositions and pH levels on the passivating effects of the solutions, while sample 6-4 shows a crosslinker composition variation for gelatin passivating materials. Samples 7-1 and 7-2 illustrate the use of higher crosslinker and passivation material concentrations in gelatin systems, while samples 7-3 to 7-5 illustrate a particularly preferred composition range for PVOH/VAM-containing solutions wherein the copolymer:crosslinker weight ratio is held constant. Formulations like that used on sample 7-4, but with slightly higher passivation copolymer concentrations (e.g., 8.5% by weight of copolymer E) are particularly useful.

Samples 8-1 and 8-2 show solutions with higher gelatin levels, with the solution employed for sample 8-2 being particularly favored for gelatin based solutions. Samples 8-3 and 8-4 illustrate the use of PVOH/VAM copolymers with higher molecular weights and/or lower amine contents than some of the other formulations, while sample 8-5 illustrates and example of a coating formulation with a high PVOH/VAM polymer level. Formulations such as the last three in the Table have lower crosslinker concentrations, due to some incompatibility between the crosslinkers and those polymers, at these particular polymer concentrations.

Of course, the foregoing examples are merely illustrative of the invention insofar as it may be practiced within the scope of the appended claims.

We claim:

1. A method for base-coating a porous ceramic catalyst support prior to applying a catalyst or catalyst support coating thereto which comprises the steps of applying to the support a coating of a liquid mixture comprising at least one coating material selected from the group of polyvinyl alcohol/vinyl amine copolymer and polyvinyl alcohol/vinyl formamide copolymer to form a coated support, and then drying the coating.

2. A method in accordance with claim 1 wherein the liquid mixture additionally comprises a cross-linking agent.

3. A method in accordance with claim 2 wherein the cross-linking agent comprises one or more agent selected from the group consisting of multifunctional carbodiimides, aldehydes, anhydrides, epoxies, imidates, isocyanates, melamine formaldehyde, epichlorohydrin, 2,5-dimethoxytetrahydrofuran, 2-(4-dimethylcarbomoyl-pyridino)ethane-1-sulfonate, phosphorous oxychloride, titanium tetrabutoxide, and ammonium zirconium carbonate.

4. A method in accordance with claim 1 wherein the liquid mixture has a pH in the range of 3–8.

5. A porous ceramic catalyst support provided with a passivation coating of a coating material selected from the group of polyvinyl alcohol/vinyl amine copolymer and polyvinyl alcohol/vinyl formamide copolymer.

6. A catalyst support in accordance with claim 5 wherein the coating material is chemically cross-linked.

7. A catalyst support in accordance with claim 5 having a ceramic composition selected from the group consisting of cordierite, aluminum titanate, and silicon carbide.

8. A catalyst support in accordance with claim 5 having the configuration of a wall-flow filter.

* * * * *